UNITED STATES PATENT OFFICE.

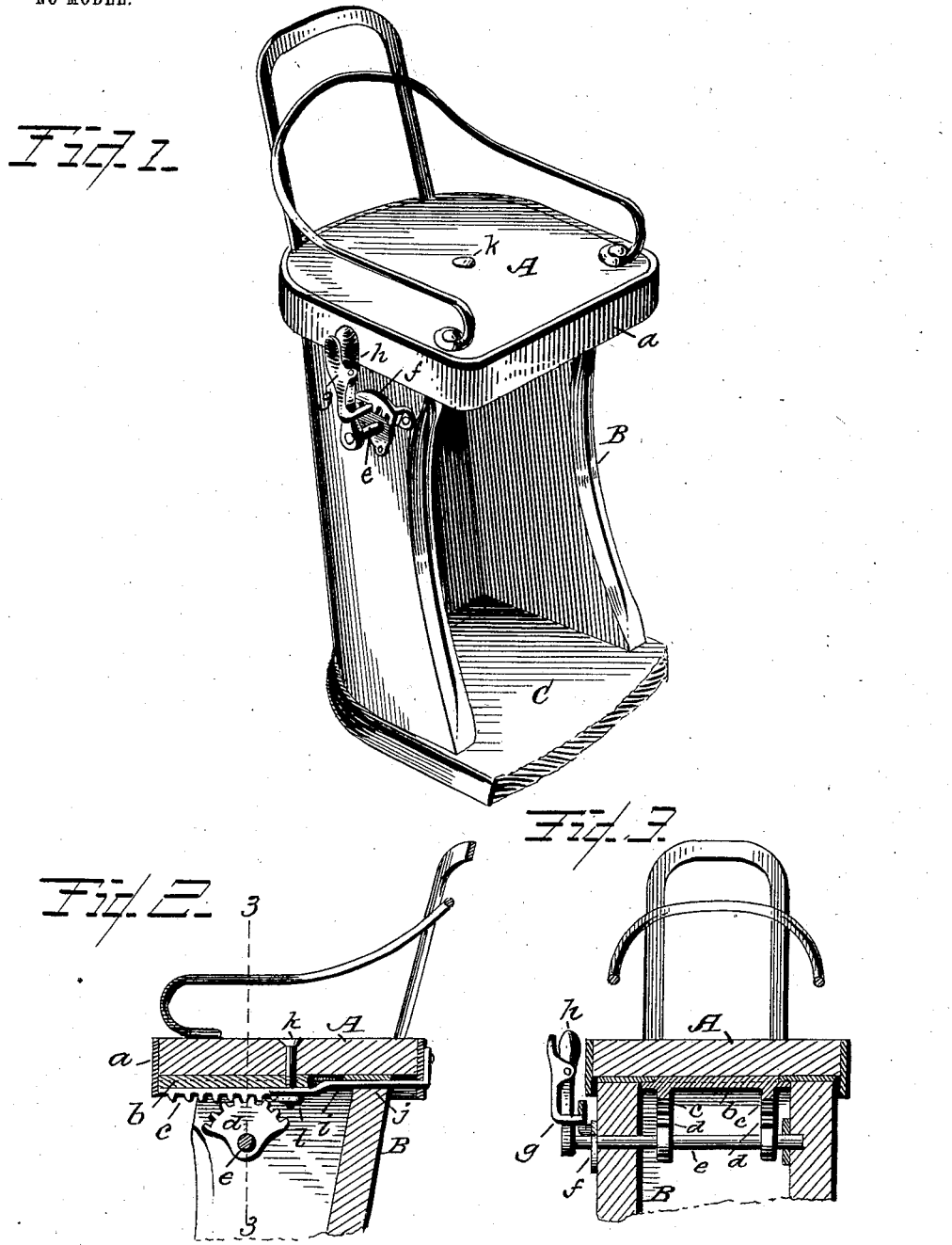

ABNER JOHNSTON, OF NEW YORK, N. Y., ASSIGNOR OF ONE-HALF TO CLARENCE L. COLLINS, OF NEW YORK, N. Y.

ADJUSTABLE SEAT FOR TWO-WHEELED VEHICLES.

SPECIFICATION forming part of Letters Patent No. 720,524, dated February 10, 1903.

Application filed November 12, 1902. Serial No. 131,016. (No model.)

*To all whom it may concern:*

Be it known that I, ABNER JOHNSTON, a citizen of the United States, residing at New York, in the county of New York and State of New York, have invented certain new and useful Improvements in Adjustable Seats for Two-Wheeled Vehicles; and I do hereby declare that the following is a full, clear, and exact description of the same, reference being had to the annexed drawings, making a part of this specification, and to the letters of reference marked thereon.

The present invention has reference to that class of seats for two-wheeled vehicles—such as hansoms, buggies, and other two-wheeled vehicles—in which the driver's seat is rendered adjustable, so as to equalize the weight thereon and balance the vehicle in accordance with the load carried thereby.

The invention has for its object to provide a simple, easily-operated, and practical device or means for adjusting the vehicle-seat and holding it in its adjusted position and is designed as an improvement upon my former patent, dated October 7, 1902, No. 710,582.

The invention consists in providing a rack-bar and toothed segment for adjusting the seat and means for holding the seat in its adjusted position and means for guiding the seat in its movement, substantially as shown in the drawings and hereinafter described and claimed.

Figure 1 of the drawings is a perspective view of a driver's seat for two-wheeled vehicles embodying my invention; Fig. 2, a detail sectional elevation thereof; Fig. 3, a transverse section taken on line 3 3 of Fig. 2.

In the accompanying drawings, A represents the driver's seat of a hansom or other two-wheeled vehicle adapted to slide upon a suitable shell or standard B, which forms the support for the seat, and C represents the footboard, extending from the shell or standard, all of which may be of any suitable construction found most preferable in accordance with the style or class of vehicle to which the adjustable seat is connected.

The seat A has a downwardly-extending flange $a$ around its four sides, the sides of the depending flange forming guides to the seat when being adjusted and the front and back of said flange forming stops to limit the forward and backward movement of the seat and to control its extent of adjustment. The seat A has a strengthening-plate $b$ secured to its under side to brace and reinforce the seat and increase its strength and durability. This plate $b$ is provided with rack-bars $c$, which engage toothed segments $d$, keyed or otherwise rigidly secured to a transverse shaft $e$, which has its bearings in the sides of the shell or standard supporting the seat. The rotation of the shaft $e$ in its bearings and the toothed segments $d$ thereon engaging the rack-bars $c$ will cause the seat to move back or forth, as required, to adjust the position thereof as required by the load carried by the vehicle. A spring-actuated latch is provided, so as to lock the seat in its adjusted position, and preferably consists of a toothed bracket $f$, secured to the side of the shell or standard, with which engages a spring-actuated pawl $g$, which is pivoted to a hand operating-lever $h$, secured to the projecting end of the transverse shaft $e$. This lever by its movement back or forth will cause the shaft to which it is connected to move upon its bearings, and through the toothed segments engaging with the rack-bars the seat will be moved forward or backward, as required, to adjust the position of seat to balance the weight of load carried by the vehicle.

Any well-known or suitable spring-actuated latch may be substituted that will hold the shaft against rotating after the seat has been adjusted, and thereby hold the seat securely in its adjusted position.

Upon the under side of the seat is secured the guide-bar $i$, which guide-bar extends through a groove in the upper edge of the shell or standard, as shown at $j$, and is secured at its front end by means of a screw $k$ and nut $l$, as shown in Fig. 2 of the drawings. I do not desire to be understood as limiting my invention to the precise construction herein shown and described, as many changes or modifications in the various details of construction may be resorted to without in any manner affecting the essential features of the invention or departing from the principle thereof.

Having now fully described my invention, what I claim as new, and desire to secure by Letters Patent, is—

1. In a slidable and adjustable driver's seat for vehicles, a guide-bar upon the under side of the seat extending in a direction with the sliding movement thereof, means for adjusting the seat and holding it in its adjusted position, comprising rack-bars, a rotatable shaft with toothed segments thereon to engage the rack-bars, a suitable toothed bracket upon the shell or support to the seat, an operating-lever connecting with the rotatable shaft, and a spring-actuated latch upon the lever and adapted to engage the toothed bracket to hold the seat in its adjusted position, substantially as and for the purpose set forth.

2. In a slidable and adjustable driver's seat for vehicles, a seat having rack-bars upon its under side, and a downwardly-extending flange to act as stops to limit the forward-and-backward movement of the seat, a rotatable shaft extending out through the side of the seat-support, toothed segments upon the shaft to engage the rack-bars, a toothed bracket upon the outer side of the seat-support, and a spring-actuated latch connecting with the shaft to engage the bracket to hold the seat in its adjusted position, substantially as and for the purpose specified.

In testimony that I claim the above I have hereunto subscribed my name in the presence of two witnesses.

ABNER JOHNSTON.

Witnesses:
JOHN D. McEWEN,
H. BRUNNQUELL.